(12) United States Patent
Burns

(10) Patent No.: US 9,251,852 B2
(45) Date of Patent: Feb. 2, 2016

(54) SYSTEMS AND METHODS FOR GENERATION OF COMPOSITE VIDEO

(71) Applicant: Panopto, Inc., Seattle, WA (US)

(72) Inventor: Eric Burns, Seattle, WA (US)

(73) Assignee: Panopto, Inc., Seattle, WA (US)

( * ) Notice: Subject to any disclaimer, the term of this patent is extended or adjusted under 35 U.S.C. 154(b) by 0 days.

(21) Appl. No.: 14/075,134

(22) Filed: Nov. 8, 2013

(65) Prior Publication Data

US 2014/0133836 A1    May 15, 2014

Related U.S. Application Data

(60) Provisional application No. 61/726,851, filed on Nov. 15, 2012.

(51) Int. Cl.
*H04N 7/15* (2006.01)
*G11B 27/036* (2006.01)
*G11B 27/10* (2006.01)

(52) U.S. Cl.
CPC ............. *G11B 27/036* (2013.01); *G11B 27/10* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 2003/0161610 A1* | 8/2003 | Miyazawa et al. | 386/69 |
| 2008/0022145 A1* | 1/2008 | Murtagh et al. | 713/503 |
| 2008/0030578 A1* | 2/2008 | Razzaque et al. | 348/143 |
| 2008/0309774 A1* | 12/2008 | Beng Goh et al. | 348/218.1 |
| 2012/0092443 A1* | 4/2012 | Mauchly | 348/14.12 |
| 2012/0317598 A1* | 12/2012 | Gilson | 725/32 |
| 2013/0021059 A1* | 1/2013 | Singh et al. | 326/39 |

* cited by examiner

*Primary Examiner* — William C Vaughn, Jr.
*Assistant Examiner* — Eileen Adams
(74) *Attorney, Agent, or Firm* — Perkins Coie LLP

(57) ABSTRACT

Systems and methods for generating a composite video based on a plurality of input streams are provided. A first video stream is received from a first device. A second video stream and coordination information are received from a second device. The coordination information includes instructions for combining the first video stream and the second video stream in a composite video. The first video stream and the second video stream are time aligned, and the instructions of the coordination information and the time-aligned first video stream and second video stream are used to generate the composite video.

31 Claims, 11 Drawing Sheets

SYSTEMS AND METHODS FOR GENERATION OF COMPOSITE VIDEO

CROSS-REFERENCE TO RELATED APPLICATIONS

This application claims priority to U.S. Provisional Patent Application No. 61/726,851, filed Nov. 15, 2012, entitled "Systems and Methods for Generation of Composite Video," the entirety of which is herein incorporated by reference.

This application is related to U.S. Provisional Patent Application No. 61/641,946, filed May 3, 2012, U.S. patent application Ser. No. 11/489,840, filed Jul. 20, 2006, and U.S. patent application Ser. No. 11/634,441, filed Dec. 6, 2006, the disclosure of all of which is herein incorporated by reference.

TECHNICAL FIELD

The technology described herein relates generally to video production and more particularly to composite video production from multiple input video sources.

BACKGROUND

When displaying a recorded video (e.g., video of a sporting event, academic lecture, or news story), it is often desirable to supplement the video with related text, images, audio, and/or other video. For example, it may be desirable to supplement a recorded video of a professor's lecture with presentation slides including related text, images, or video, such that the lecture video and presentation slides are displayed simultaneously in separate sub-regions of an overall display. However, creating a final video product containing the original recorded video and supplemental material may be a time-consuming and expensive process. Oftentimes, costly video editing hardware and software is used to splice together the original recorded video and the supplemental material to provide the final product, and generation of that final product using the video editing hardware and software may require many hours of work by one or more video editing personnel.

SUMMARY

The present disclosure is directed to systems and methods for generating a composite video based on a plurality of input streams. A first video stream is received from a first device. A second video stream and coordination information are received from a second device. The coordination information includes instructions for combining the first video stream and the second video stream in a composite video. The first video stream and the second video stream are time aligned, and the instructions of the coordination information and the time-aligned first video stream and second video stream are used to generate the composite video.

In another method for generating a composite video based on a plurality of input streams, a first video stream is received. A second video stream and coordination information are generated, where the coordination information includes instructions for combining the first video stream and the second video stream in a composite video. The second video stream or the coordination information is generated based on the received first video stream. The second video stream and the coordination information are transmitted to a device configured to combine the first video stream and the second video stream in a composite video based on the coordination information.

DETAILED DESCRIPTION

Figure 1:
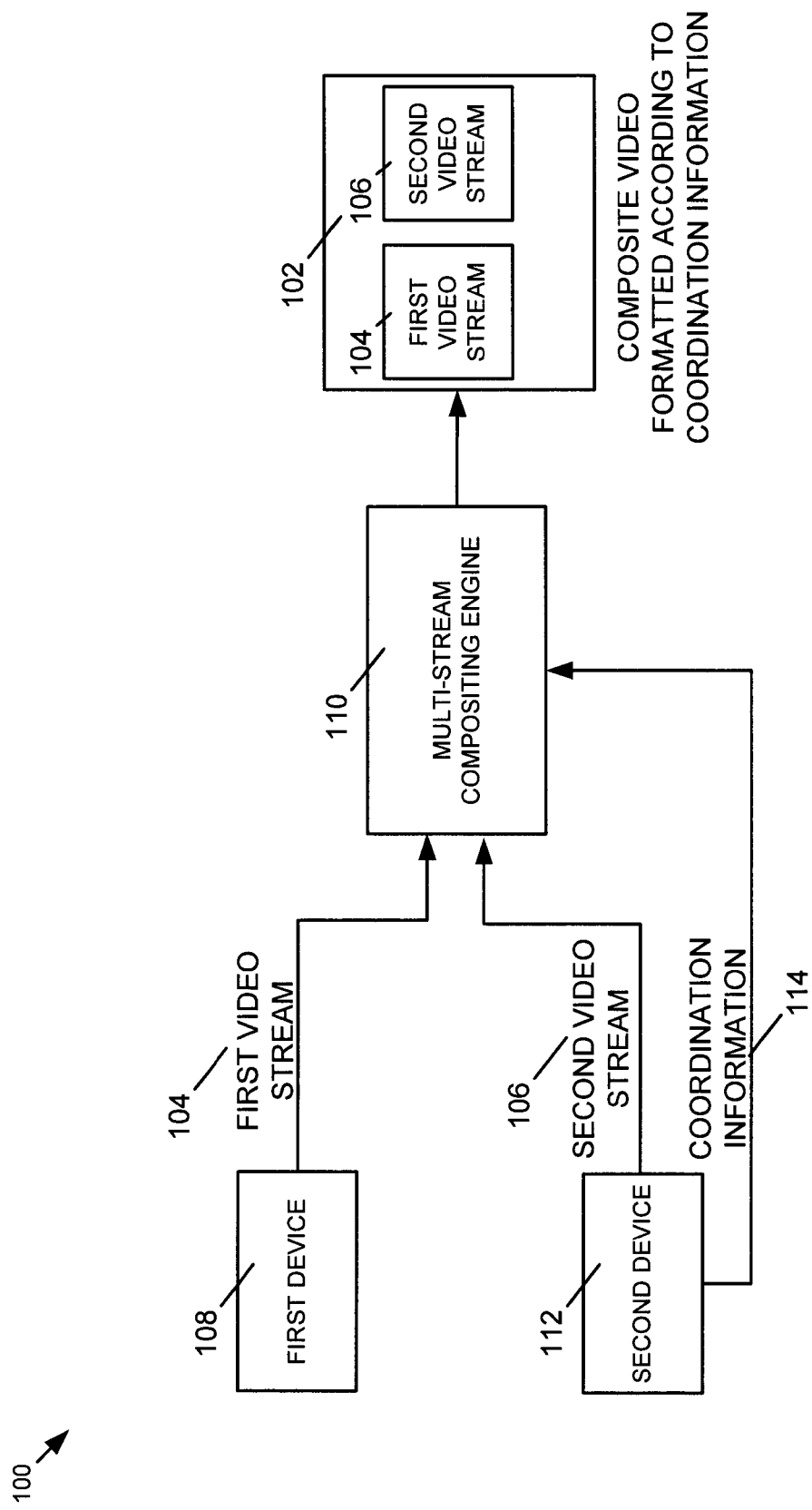
FIG. 1 depicts an example computer-implemented system for generating a composite video based on a first video stream and a second video stream.

FIG. 1 depicts an example computer-implemented system 100 for generating a composite video 102 based on a first video stream 104 and a second video stream 106. In the system 100, a first device 108 may transmit the first video stream 104 to a multi-stream compositing engine 110. A second device 112 may transmit the second video stream 106 and coordination information 114 to the multi-stream compositing engine 110. The multi-stream compositing engine 110 may combine the first and second video streams 104, 106 in the composite video 102 based on instructions included in the coordination information 114. The instructions of the coordination information 114 may be used to control, for example, the relative sizes and positions of the first and second video streams 104, 106 in the composite video 102.

Figure 2:
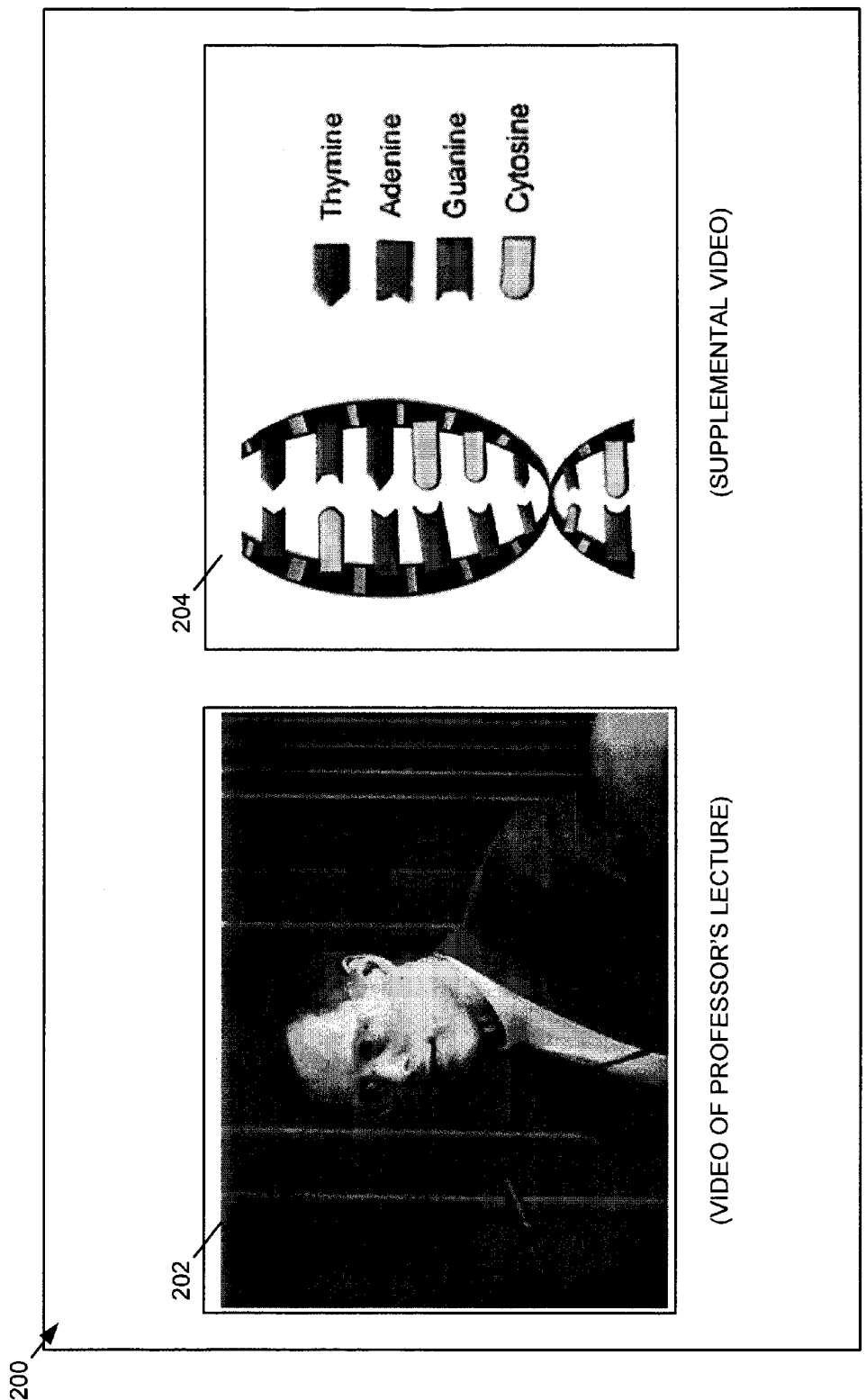
FIG. 2 depicts an example composite video including a first video stream and a second video stream that may be generated with a multi-stream compositing engine.

FIG. 2 depicts an example composite video 200 including a first video stream 202 and a second video stream 204 that may be generated with a multi-stream compositing engine. In the composite video 200, the first video stream 202 includes video of a professor's lecture, and the second video stream 204 includes related video intended to supplement a student's understanding of the lecture. For example, after the professor explains the four bases found in DNA in the first video stream 202, the second video stream 204 may be updated to display the image depicted in FIG. 2. The first and second video streams 202, 204 may be received from separate first and second devices and combined in the multi-stream compositing engine based on instructions in received coordination information from one or both of the devices.

In the example of FIG. 2, the coordination information may specify particular sub-regions of the overall composite video display 200 in which to display the first and second video streams 202, 204. Alternatively, the coordination information may specify the particular sub-regions while also providing instructions for controlling the playback of the video streams 202, 204. For example, the coordination information may instruct the multi-stream compositing engine to pause the first video stream 202 at particular points to allow students to take notes. While first video stream 202 is paused, the coordination information may allow the second video stream 204 to continue its playback. Numerous other video manipulation instructions may be included in the coordination information (e.g., fast-forward, rewind, slow motion). All such instructions may be reflected in the final composite video product 200, including the overall appearance of the display (i.e., the selected sub-regions of the display used for each stream) and the temporal coordination of the two video streams' playback (i.e., the time synchronization of streams 202, 204).

With reference again to FIG. 1, the second device 112 may be configured to receive the first video stream 104. This may enable a user of the second device 112 to generate the second video stream 106 based on the first video stream 104. Thus, the user of the second device 112 may record the second video stream 106 on the second device 112 while viewing the first video stream 104. For example, if the second device 112 includes a video camera component, the user may view the first video stream 104 on the device 112 and simultaneously record the second video stream 106 to respond to or supplement the first stream 104. In the example of FIG. 2, the user of the second device 112 may view the professor's lecture in the first video stream 104 and choose the precise point in time in which to display the image containing the four DNA bases in the second video stream 106. When the first and second video streams 104, 106 are time-aligned (i.e., synchronized) and combined in the multi-stream compositing engine 110, the first and second video streams 104, 106 may complement and/or supplement each other.

Numerous types of composite videos 102 may be generated in this manner. As in the previous examples, the first and second video streams 104, 106 may each include full motion video footage. In another example, the second video stream 106 may include annotation information (i.e., "virtual ink") that may be "hand-drawn" over the first video stream 104 and overlaid on top of it in the final composite video 102. In another example, the second video 106 may include a still image (e.g., a photograph, web browser screen capture, text display) represented as a video stream. In another example, the second video stream 106 may include no viewable material and may instead include only audio data represented as a video stream.

The receipt of the first video stream 104 at the second device 112 may also enable the user of the second device 112 to generate the coordination information 114 based on the first video stream 104. In an example, the coordination information 114 may be generated via a software program that allows the user to control and manipulate the video streams 104, 106 on a virtual "presentation canvas" to generate the coordination information. With reference to the example of FIG. 2, the user may position the first and second video streams 202, 204 in particular sub-regions of the presentation canvas software using a "drag and drop" technique. This positioning of the video streams 202, 204 may be reflected in coordination information 114. After positioning the video streams 202, 204, the user may begin playback of the professor's lecture video in the first video stream 202. After beginning playback of the first stream 202, the user's subsequent actions within the virtual presentation canvas software may be recorded and included in the coordination information 114. For example, based on material presented throughout the professor's lecture video, the user may at various points change the video displayed in the second video stream 204. The video streams 202, 204 may also be re-sized, slowed down, sped up, paused, stopped, rewound, or fast-forwarded. This manipulation of the second video stream 204 may also be reflected in coordination information 114.

Thus, the user's drag and drop actions and video manipulation actions within the presentation canvas software program may be converted into machine code instructions in the coordination information 114. These instructions may be used by the multi-stream compositing engine 110 to create the composite video 102 according to the user's actions. The composite video final product 102 may thus be a verbatim or near-verbatim representation of the user's actions in the presentation canvas software (i.e., the composite video 102 may reflect exactly what the user sees when coordinating the streams 104, 106 within the software of the second device 112). Using such software and the multi-stream compositing engine 110, composite video 102 may be generated "on the fly" (i.e., the second video stream 106 may be generated and coordinated with the first video stream 104 during a live playback of the first stream 104). This may be an efficient method of producing the composite video 102.

Although expensive and time-consuming hardware and software video editing techniques may be desirable for some applications (e.g., producing a feature film or documentary), the "on the fly" production method enabled by the system 100 may be desirable for many other applications. For example, as reflected in the example of FIG. 2, educational institutions may utilize the "on the fly" production method to create composite video 200 by combining the professor's lecture video with supplemental notes, presentation slides, websites, or other video. Because the system 100 may allow the composite video to be generated "on the fly," the system 100 may enable the composite video 200 to be generated and distributed via a network (e.g., the Internet) in near real-time, such that students in remote locations could view the lecture and supplemental material at nearly the same time as the lecture is occurring. For the near real-time distribution system to be accomplished, the user of the second device 112 may receive a live feed of the first video stream 104 as it is occurring. The user may coordinate the live feed of the first video stream 104 with the supplemental second video stream 106 in the presentation canvas software. The multi-stream compositing engine 110 may receive live feeds of the video streams 104, 106 and coordination information 114 from their respective sources as they are being generated. The multi-stream compositing engine 110 may generate the composite video 102 from the live feeds, allowing the composite video 102 to be distributed in near real-time.

Other potential applications may include live video commentary on a news event as it is occurring, a recorded board of directors meeting involving board members located in remote places, and audio commentary and/or telestration annotation for a live sporting event. In another example, the composite video 102 is not produced using live feeds of the first and second video streams 104, 106, and one or both of the video streams 104, 106 may be pre-recorded and combined at a later time by the multi-stream compositing engine 110.

Figure 3:
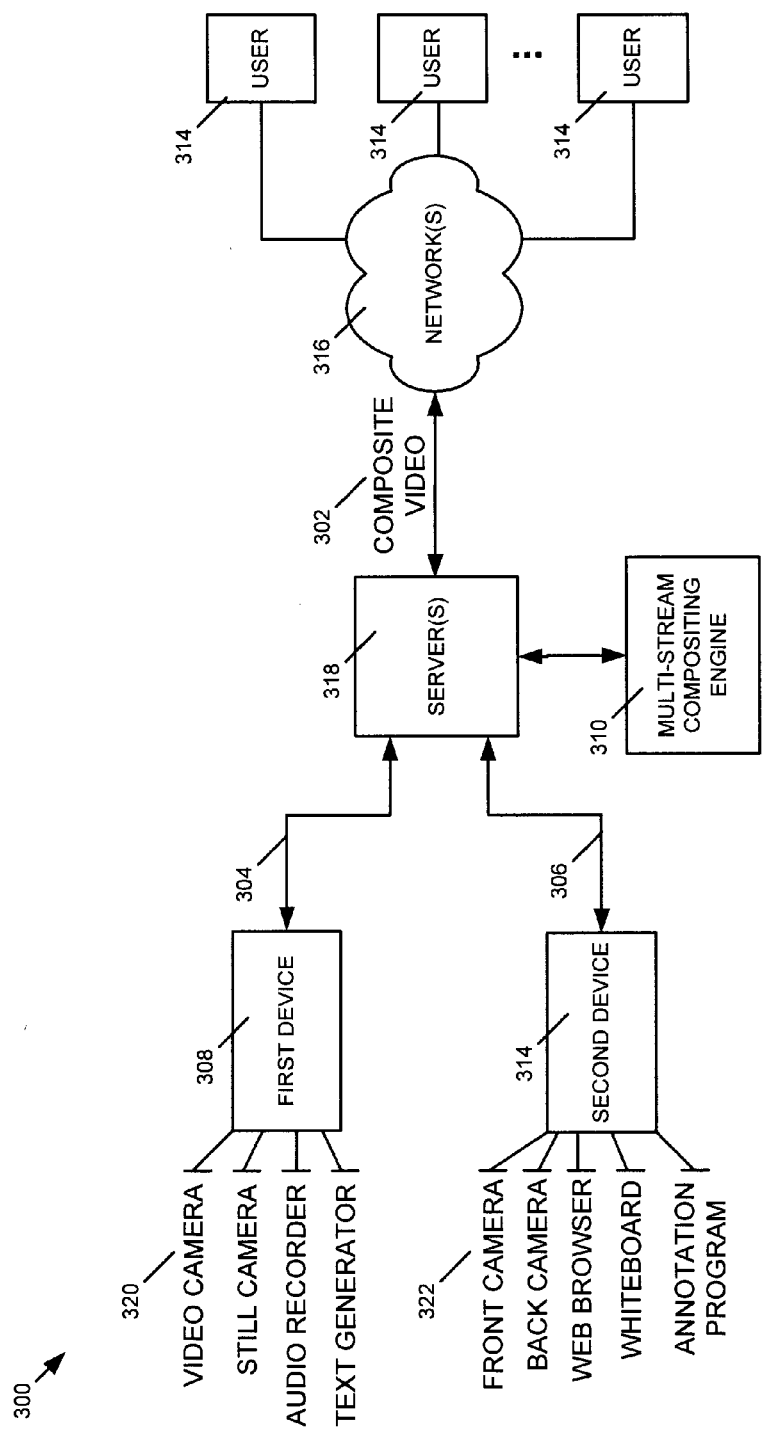
FIG. 3 depicts another computer-implemented system for generating a composite video based on a first video stream and a second video stream.

FIG. 3 depicts another computer-implemented system 300 for generating a composite video 302 based on a first video stream 304 and a second video stream 306. Similar to FIG. 1, the system of FIG. 3 includes a first device 308 configured to transmit the first video stream 304 to a multi-stream compositing engine 310. A second device 314 may transmit the second video stream 306 to the multi-stream compositing engine 310. The first and second devices 308, 314 may interact with the multi-stream compositing engine 310 through one or more servers 318, which can host the multi-stream compositing engine 310. The multi-stream compositing engine 310 may use the first and second video streams 304, 306 to generate the composite video 302. The multi-stream compositing engine 310 may be implemented using a processing system (e.g., one or more computer processors) executing software operations or routines for generating the composite video 302. User computers 314 (e.g., desktop computers, laptop computers, tablet computers, smart phones) may interact with the multi-stream compositing engine 310 through a number of ways, such as over one or more networks 316. It should be understood that the multi-stream compositing engine 310 could also be provided on a stand-alone computer for access by a user 314.

In the example system 300 of FIG. 3, the first device 308 or the second device 314 may function as a coordinating device used to transmit coordination information to the multi-stream compositing engine 310. In another example, both the first and second devices 308, 314 may be enabled to generate and transmit coordination information to the multi-stream compositing engine 310. In another example, one of the devices 308, 314 may execute a full version of the virtual presentation canvas software program described above, while the other device may execute a streamlined, "light" version of the software with fewer features and/or editing capabilities.

FIG. 3 illustrates example components of the first and second devices 308, 314 that may be used to produce the first and second video streams 304, 306, respectively. The first device 308 may be an iPhone or other smartphone and may include, for example, a video camera, still camera, audio recorder, and/or text generator 320. Video captured by the video camera may be used to generate the first video stream 304 directly, while images, audio, and text generated by the still camera, audio recorder, and text generator, respectively, may each be converted to a video stream and placed in the first video stream 304. The second device 314 may be an iPad or other tablet computing device and may include, for example, a front camera, back camera, web browser, whiteboard software program, and annotation software program (e.g., a "virtual ink" or telestrator program) 322. The front and back cameras may be used to produce the second video stream 306 directly, while output from the web browser, whiteboard software program, and annotation software program may be converted to a video stream and placed in the second video stream 306. Other example second devices include, for example, a laptop computer, desktop computer, or smartphone device. The second device 314 in this example may receive the first video stream 304 and allow for the creation of the second video stream 306 via one or more of its components 322 while the first video stream 304 is being played back.

In one example, the second device 314 may receive the first video stream 308 from the one or more servers 318. Use of the one or more servers 318 to deliver the first video stream 304 to the second device 314 may be desirable in situations where a user of the second device 314 wishes to stop, pause, or rewind video of the first video stream 304 in the composite video 302. In these situations, the one or more servers 318 may be configured to provide video buffering to the second device 314, such that the user can pause, stop, rewind, or otherwise manipulate a live feed of the first video stream 304 during creation of the composite video 302. In another example, the second device 314 may receive the first video stream 304 from an external network not connected to the one or more servers 318 (e.g., a local area network, virtual private network, the Internet).

Figure 4:
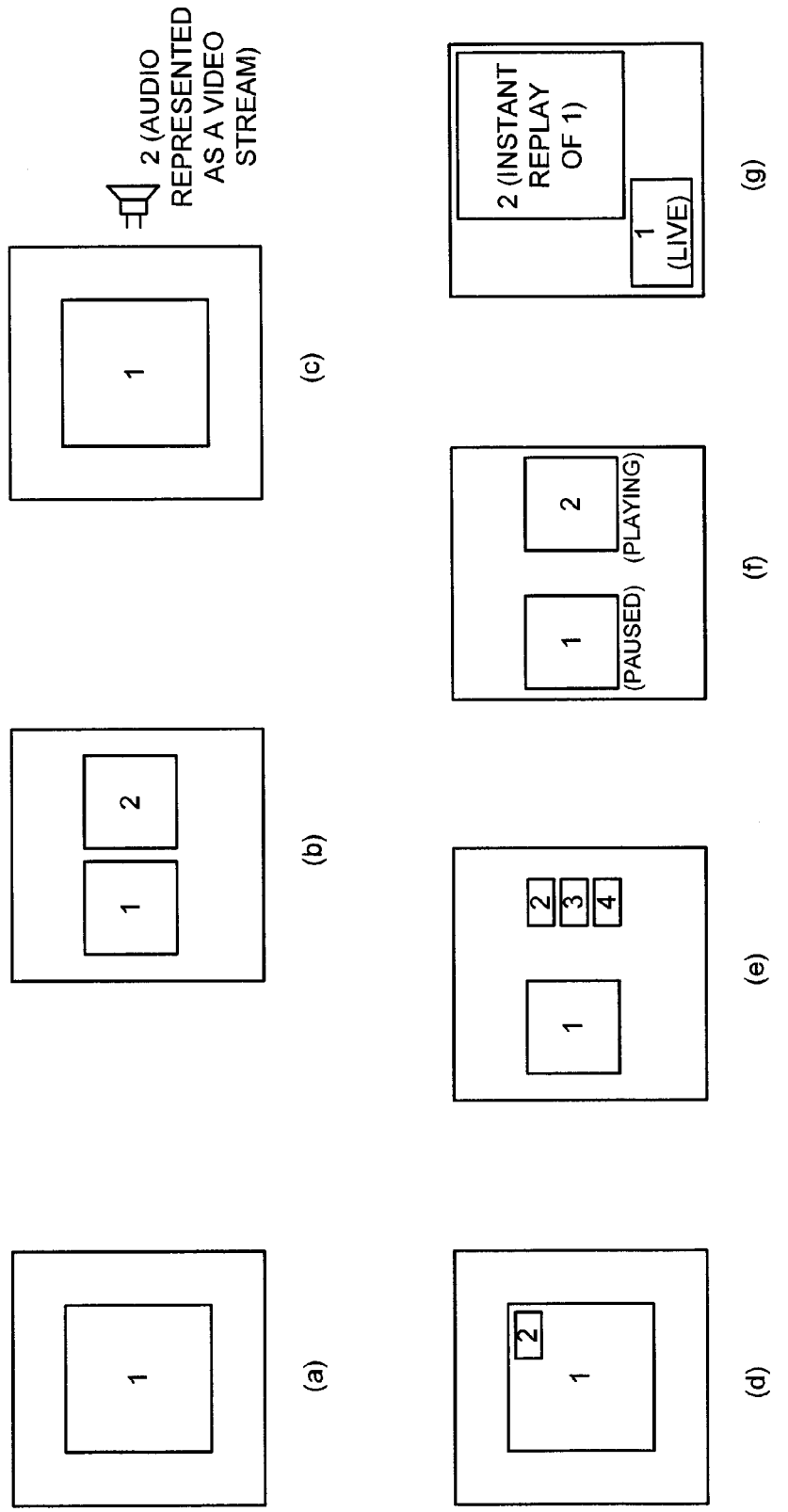
FIG. 4 depicts different composite video configurations that may be generated by a multi-stream compositing engine based on first and second video streams and coordination information.

FIG. 4 depicts different composite video configurations that may be generated by a multi-stream compositing engine based on first and second video streams and coordination information. The different configurations depicted in FIG. 4 may be created, for example, using the example computer-implemented systems of FIGS. 1 and 3, where a user of a second device controls positioning and playback of first and second video streams in the composite video using coordination information sent to the multi-compositing engine. Display (a) depicts an example display where the coordination information includes instructions to the multi-stream compositing engine to display only a first video stream (denoted throughout FIG. 4 in sub-regions of the composite video display labeled "1") and to not display a second video stream (denoted throughout FIG. 4 in sub-regions of the composite video display labeled "2").

Display (b) of FIG. 4 depicts an example display where first and second video streams are displayed adjacent to each other in separate sub-regions of the composite video display. Display (b) is similar to the display depicted in FIG. 2, where the first video stream 202 includes video of a professor's lecture and the second video stream 204 includes supplemental video keyed to the content of the professor's lecture. The first and second video streams in display (b) may include, for example, video, a still image represented as a video stream, web browser output represented as a video stream, text represented as a video stream, output from a whiteboard computer software program represented as a video stream, and output from presentation software (e.g., Microsoft Powerpoint, Adobe Acrobat) represented as a video stream.

Display (c) of FIG. 4 depicts an example display including a viewable first video stream and a second video stream that includes only audio data represented as a video stream. Thus, the second video stream of display (c) includes no viewable video. Applications based on display (c) may include situations where one wishes to provide audio commentary on a video-recorded event but does not wish to use any portion of the overall composite video display for displaying video of a person providing the commentary. Alternatively, displays similar to display (c) may be generated when the device generating the second stream does not include a video recording capability but allows for audio recording.

Display (d) of FIG. 4 depicts an example display including a large first video stream overlaid with a smaller second video stream. An example use of display (d) may be where the second video stream includes annotation information (e.g., virtual ink) intended to be overlaid on top of the first video stream. For example, a user of the second device may use an annotation software program to "draw" over the first video stream. Alternatively, the overlaid second video stream may be used to implement a "picture-in-picture" display or a stock market ticker-tape display that covers a portion of the first video stream, for example.

Display (e) of FIG. 4 depicts an example display including a larger first video stream and multiple secondary video streams displayed in separate sub-regions of the overall composite video display. An example use of display (e) may be where a user wishes to supplement a primary first video stream with multiple, different secondary video streams. With reference to FIG. 2, the user may wish to supplement the professor's lecture video stream 202 with both a still image and a number of changing presentation slides. Using the presentation canvas software described above, the user may choose the particular sub-regions of the composite video display in which to display the streams and may manipulate and coordinate the playback of all streams. The display and coordination decisions of the user may be reflected in instructions in the coordination information used by the multi-stream compositing engine.

Display (f) of FIG. 4 depicts an example display where a first video stream is paused and a second video stream is playing. Display (f) illustrates that coordination information generated by a second device may instruct the multi-stream compositing engine to change the playback properties of the first and second video streams, such that one or both of them is not played continuously. Other standard video manipulation techniques may be similarly enabled and reflected in the composite video (e.g., fast-forwarding, rewinding, stopping, slow motion).

Display (g) of FIG. 4 depicts an example display where a second video stream may include instant replay video of a portion of a first video stream. Thus, in this example, a live playback of the first video stream is minimized in size, and the instant replay video is displayed in a larger sub-region of the composite video display.

Figure 5:
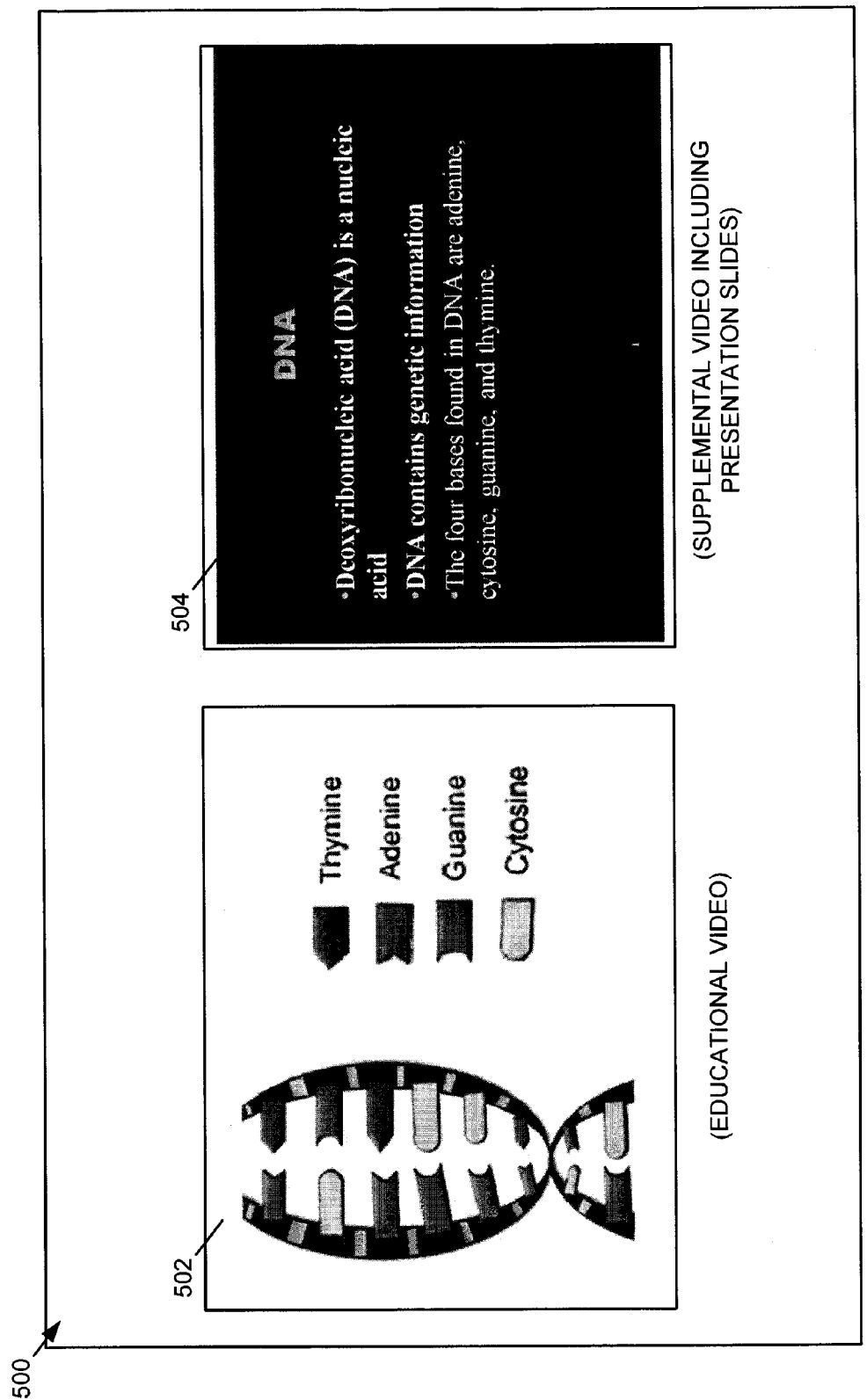
FIG. 5 depicts an example composite video display including a first video stream containing an educational video and a second video stream containing supplemental presentation slides.

FIG. 5 depicts an example composite video display 500 including a first video stream 502 containing an educational video 502 and a second video stream 504 containing supplemental presentation slides. Composite video 500 is an example composite video 500 formatted similarly to display (b) of FIG. 4. In FIG. 5, first video stream 502 may be output from a first device and delivered to a multi-stream compositing engine and a second device. The second device may be configured to execute a software program for creating the composite video 500 (e.g., software that utilizes a virtual "presentation canvas" for manipulating and coordinating the first video stream 502 and the second video stream 504). A user of the software program may choose a size for the first video stream 502 and position it within a particular sub-region of the overall composite video display 500. The user may further introduce the depicted presentation slides to be output as the second video stream 504. While viewing a live feed of the first video stream 502 or playing back a pre-recorded version of it, the user may advance through various presentation slides in the second video stream 504. The layout of the first and second video streams 502, 504 and the particular temporal coordination between the streams 502, 504 may be reflected in coordination information sent to the multi-stream compositing engine. The multi-stream compositing engine may use the received video streams 502, 504 and the coordination information to produce the composite video display 500 according to what a user sees when manipulating and coordinating the videos 502, 504 within the presentation canvas program. Because the first and second video streams may be recorded asynchronously, the multi-stream compositing program may perform a time alignment (i.e., synchronization) procedure on the first and second video streams 502, 504 to ensure proper temporal coordination in the playback of the video streams 502, 504 in the composite video 500.

Figure 6:
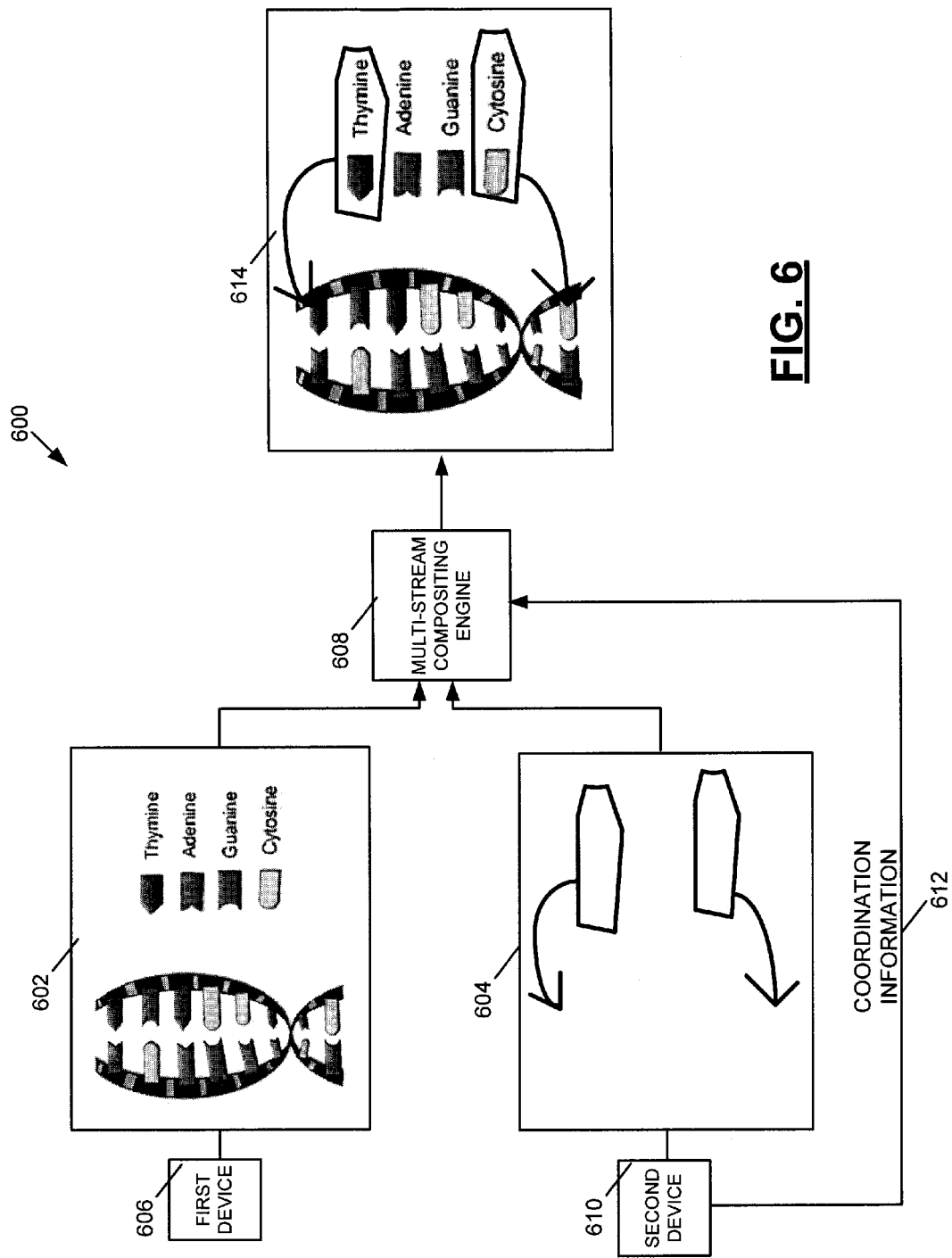
FIG. 6 depicts an example computer-implemented system for combining a first video stream with a second video stream that includes annotation information.

FIG. 6 depicts an example computer-implemented system 600 for combining a first video stream 602 with a second video stream 604 that includes annotation information. In FIG. 6, a first device 606 may transmit the first video stream 602 to a multi-stream compositing engine 608. The first device 606 may be, for example, a mobile device configured to record video (e.g., an iPhone, iPad, or other similar mobile computing device), and the first video stream 602 may include full motion video recorded using the first device 606. A second device 610 may transmit the second video stream 604 and coordination information 612 to the multi-stream compositing engine 608.

In the example of FIG. 6, the second video stream 604 includes annotation information (i.e., "virtual ink" created by allowing a user of the second device 610 to "draw" over the first video stream 602 as it is being played back within a presentation canvas software program). Although the user may view the first video stream 602 while creating the second video stream 604, the second video stream 604 may contain only new information added to the first video stream 602. In the example of FIG. 6, the new information added to the first video stream 602 includes only the virtual ink lines, and thus, only this new information is included in the second video stream 604 transmitted to the multi-stream compositing engine 608. The transmission of only the new information in the second video stream 604 may be used to avoid unnecessary re-transmission of material contained within the first video stream 602. This may be particularly desirable in situations where network bandwidth is at a premium and/or when the second device 610 is configured to receive only a lower bitrate version of the first video stream 602.

The multi-stream compositing engine 608 may combine the first and second video streams 602, 604 in the composite video output 614 using instructions in the coordination information 612. In the example of FIG. 6, the coordination information 612 may instruct the multi-stream compositing engine 608 to display both the first and second video streams 602, 604 full-screen and to overlay the second video stream 604 over the first video stream 602 to enable the desired annotation effect.

Figure 7:
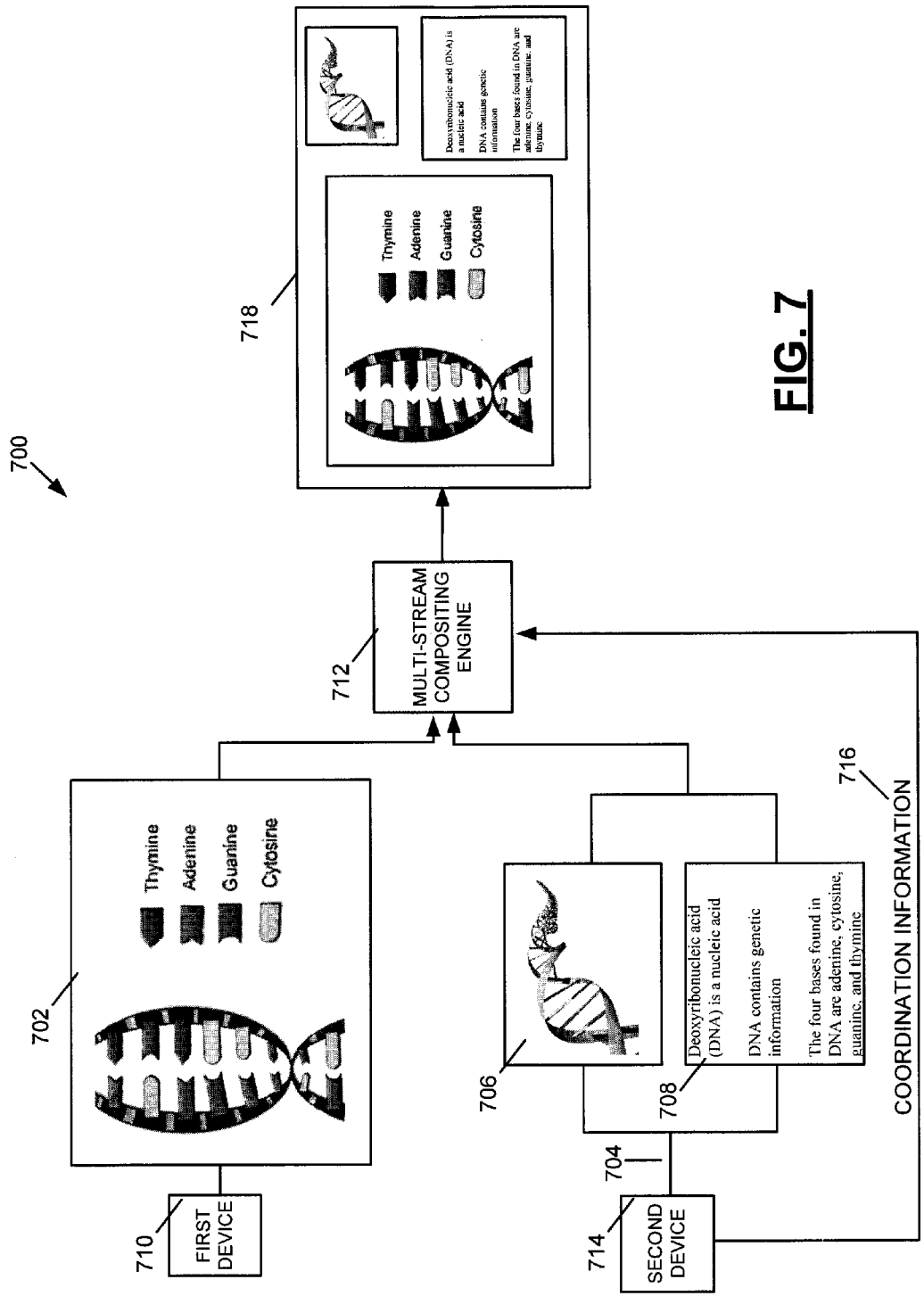
FIG. 7 depicts an example computer-implemented system for combining a first video stream with a second video stream that includes multiple individual component streams.

FIG. 7 depicts an example computer-implemented system 700 for combining a first video stream 702 with a second video stream 704 that includes multiple individual component streams 706, 708. In FIG. 7, a first device 710 may transmit the first video stream 702 to a multi-stream compositing engine 712 and to a second device 714. Based on the first video stream 702, a user of the second device 714 may generate the component video streams 706, 708 to be transmitted to the multi-stream compositing engine 712 and combined with the first video stream 702. Coordination information 716 may also be transmitted from the second device 714 to the multi-stream compositing engine 712 to instruct the multi-stream compositing engine 712 as to how the video streams 702, 704 should be combined in composite video 718.

In the example of FIG. 7, the coordination information 716 may contain instructions regarding the sizing and positioning of the first video stream 702 and of the component video streams 706, 708 comprising the second video stream 704. Thus, in the example composite video 718, the first video stream 702 is reproduced at a larger size than the component video streams 706, 708 of the second video stream 704. As explained above, sizing and temporal coordination instructions of the coordination information 716 may be created using a software program that utilizes a virtual presentation canvas, which may allow the user to drag, drop, re-size, and manipulate (e.g., fast-forward, rewind, pause, stop) the various video streams 702, 704 to dictate an appearance of the composite video 718.

Figure 8:
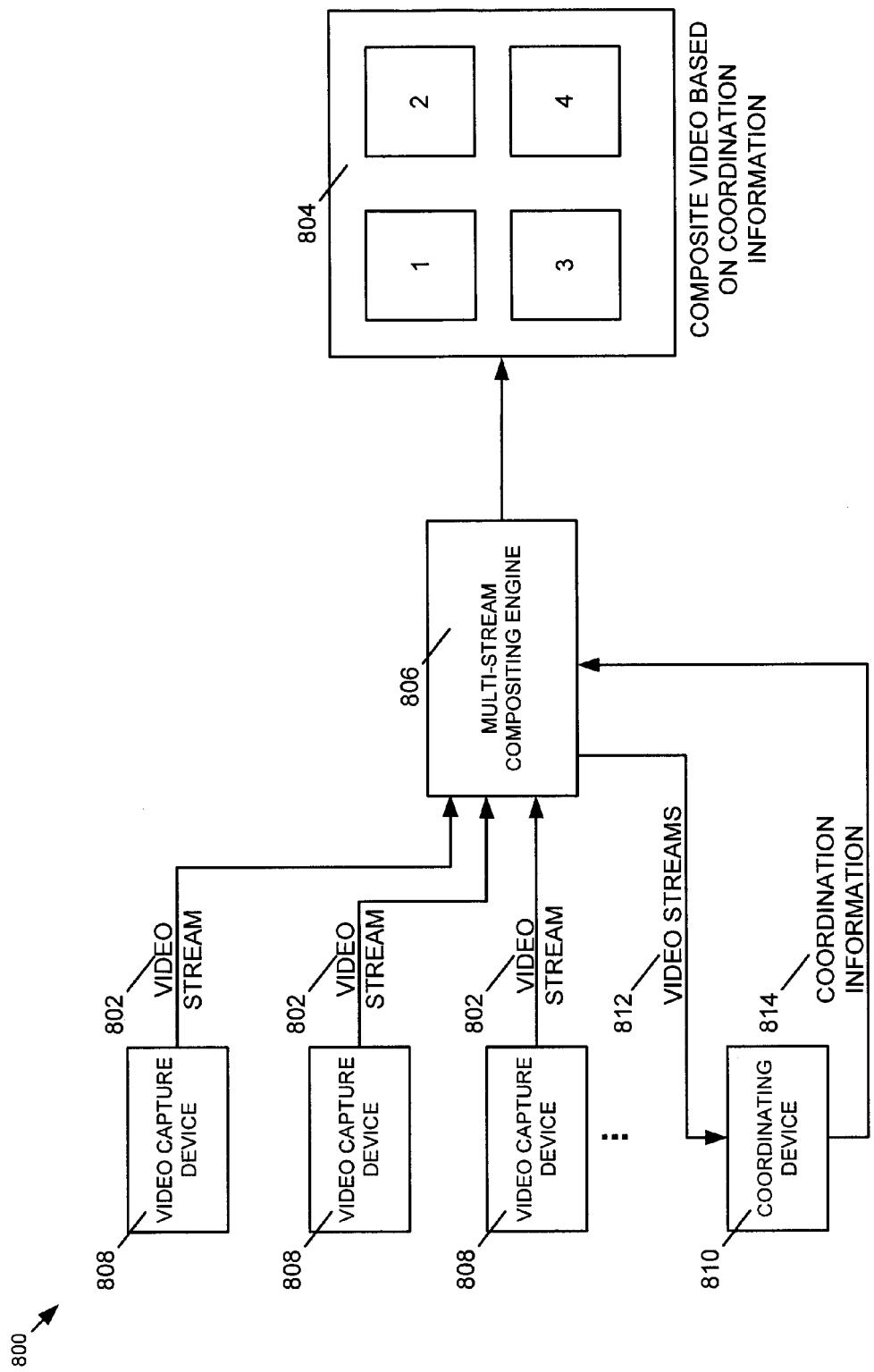
FIG. 8 depicts an example computer-implemented system for combining multiple video streams in a composite video using a coordinating device.

FIG. 8 depicts an example computer-implemented system 800 for combining multiple video streams 802 in a composite video 804 using a coordinating device 810. The multiple video streams 802 may be created using one or more video capture devices 808 and transmitted to a multi-stream compositing engine 806. The multiple streams 802 may then be transmitted from the multi-stream compositing engine 806 to the coordinating device 810 via a network connection 812. The coordinating device 810 may allow a user of the coordinating device 810 to determine how the multiple streams 802 are to be combined in the composite video 804. The instructions for combining the streams 802 may be included in coordination information 814, which may be transmitted from the coordinating device 810 to the multi-stream compositing engine 806. In the example of FIG. 8, the coordinating device 810 may not generate a video stream and may be used only for generating the coordination information 814 (e.g., using a virtual presentation canvas software program).

Figure 9:
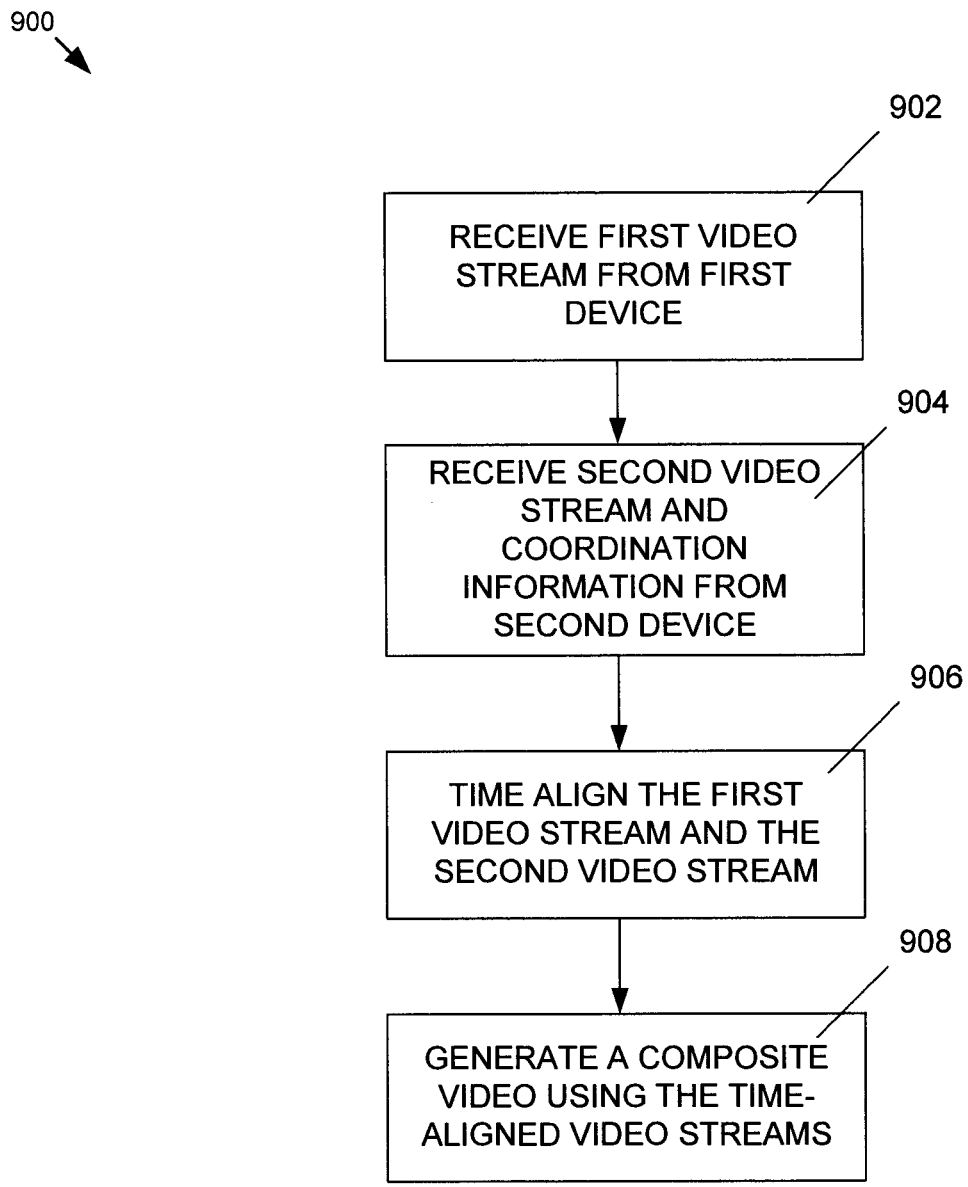
FIG. 9 is a flowchart illustrating a computer-implemented method of generating a composite video based on a plurality of input streams.

FIG. 9 is a flowchart 900 illustrating a computer-implemented method of generating a composite video based on a plurality of input streams. At 902, a first video stream is received from a first device. At 904, a second video stream and coordination information are received from a second device. The coordination information includes instructions for combining the first video stream and the second video stream in a composite video. At 906, the first video stream and the second video stream are time-aligned. The time alignment procedure may allow the first and second video streams to be synchronized in the composite video. At 908, the instructions of the coordination information and the time-aligned first and second video streams are used to generate the composite video.

The concepts of this disclosure have been described in the context of examples, and the scope of the disclosure includes many additional examples. For example, certain multi-stream composite video generation functionality may be provided to one or more devices as a downloadable application (e.g., for free or for a fee). In one configuration, a composite video creation session may be set up by a host person operating a downloadable application on a host video capture device (e.g., the second device 112 of FIG. 1, which may include the presentation canvas software program). The host video capture device (e.g., an iPad or other tablet computing device) may be used to send invitations to client participants via applications (e.g., the same host application or a client application) operating on their client video capture devices. Upon initiations of the session (e.g., upon sending of the invitations, at an identified start time, upon a signal from the host), the host video capture device and the client video capture devices may be free to begin recording input video streams. The host video capture device may allow a user to view the input video streams of the client video capture devices and to coordinate the appearance of the composite video using the presentation canvas software while recording a video input stream. Upon completion of recording, the client video capture devices may transmit their input video streams to a multi-stream compositing engine (e.g., based on a user command, automatically upon close of an application, based on a signal from a host).

As another example, once a composite video has been created, it can be shared via e-mail, text message, or social media posting (e.g., Facebook, MySpace, Twitter, YouTube, StreamWeaver). In another configuration, a composite video can be broadcast live via a website, social media outlet, or otherwise, where each of the input video streams transmits live to the multi-stream compositing engine, which constructs and transmits/streams the composite video live.

Figure 10A:
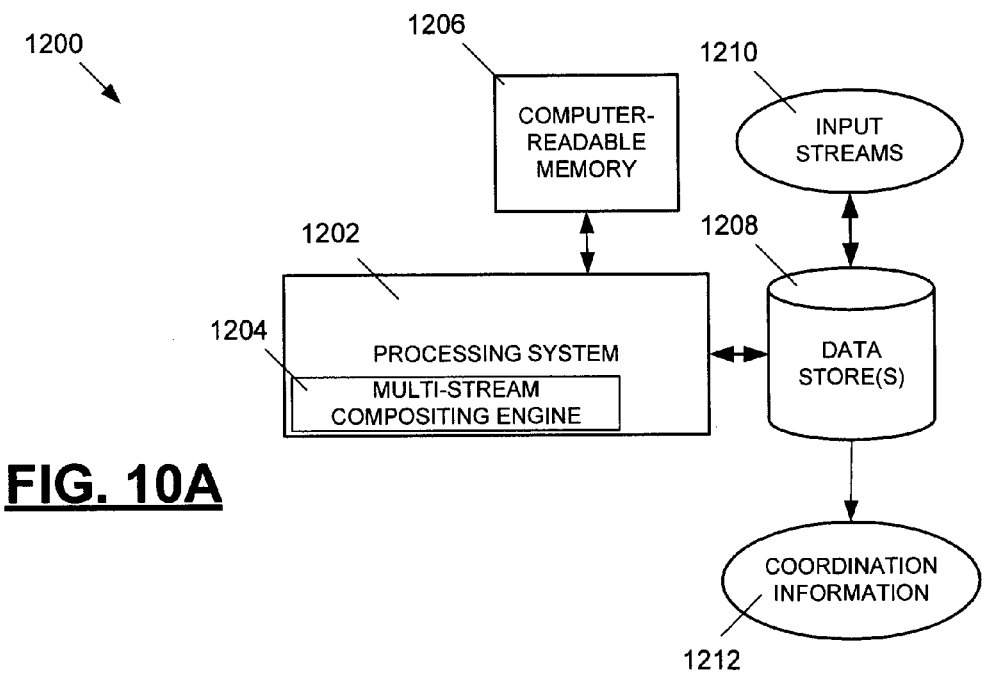
FIGS. 10A, 10B, and 10C depict example systems for use in implementing a multi-stream compositing engine.
Figure 10B:
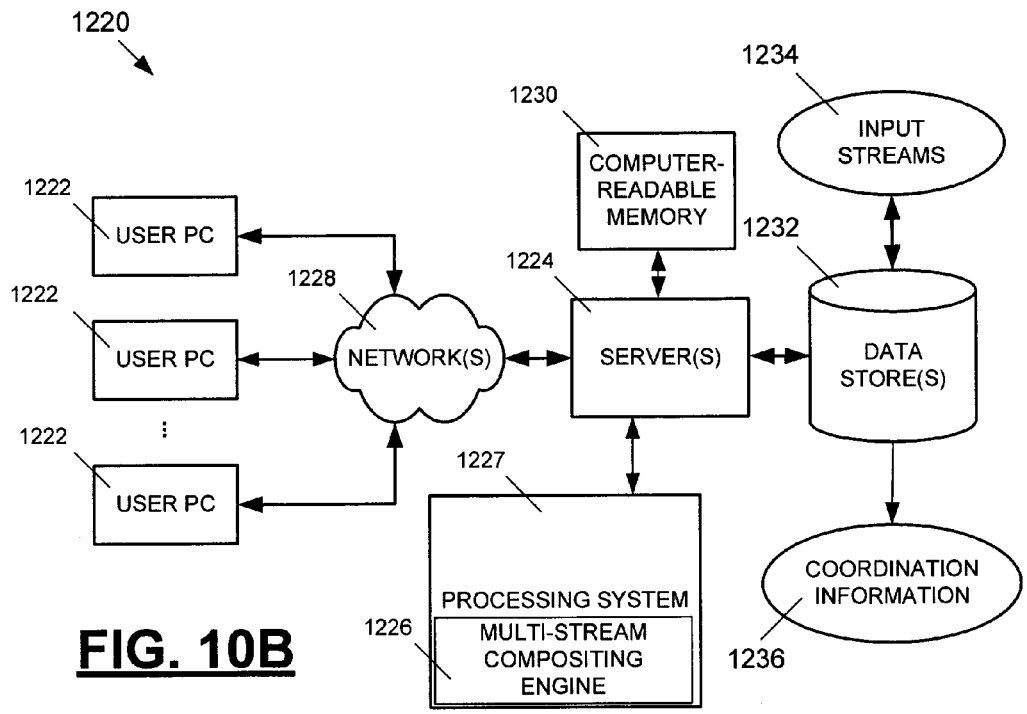
Figure 10C:
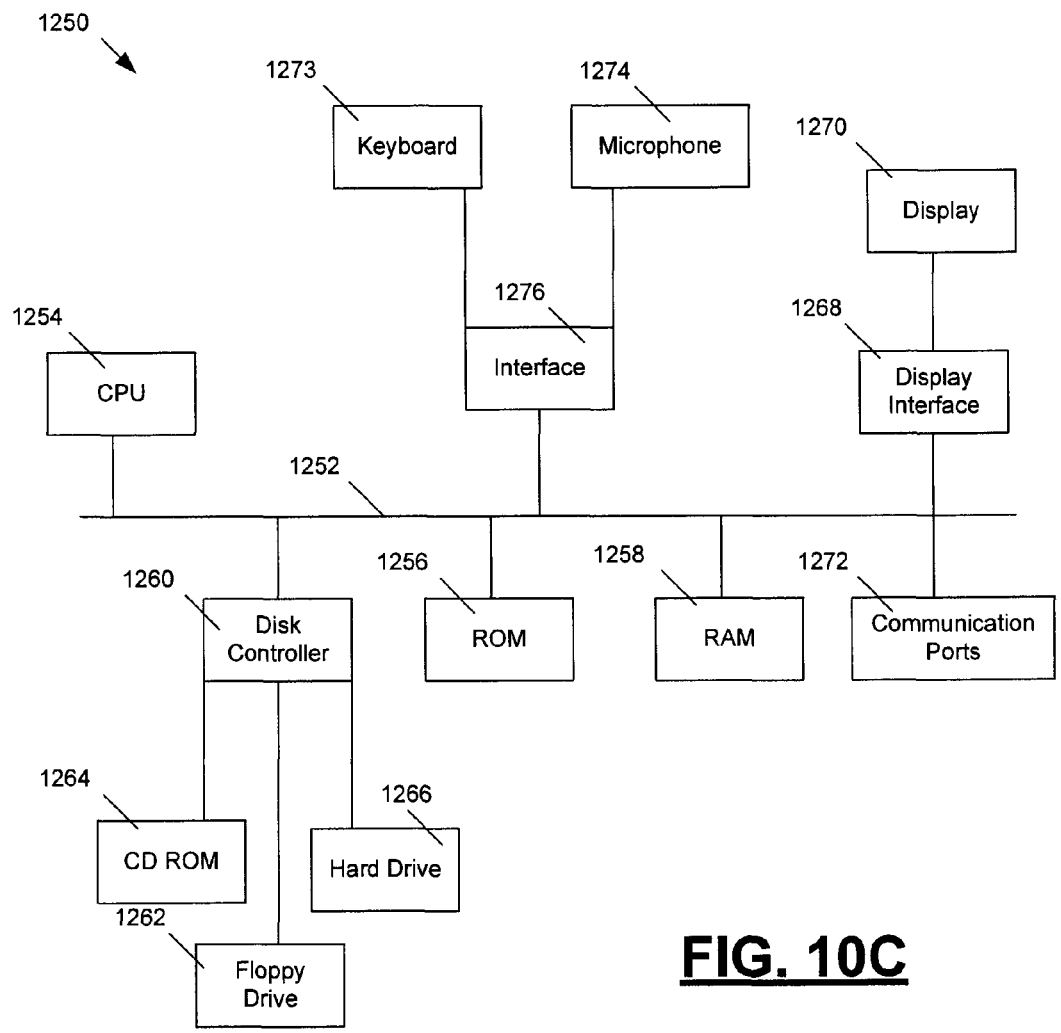

As a further example, FIGS. 10A, 10B, and 10C depict example systems for use in implementing a multi-stream compositing engine. For example, FIG. 10A depicts an exemplary system 1200 that includes a standalone computer architecture where a processing system 1202 (e.g., one or more computer processors located in a given computer or in multiple computers that may be separate and distinct from one another) includes a multi-stream compositing engine 1204 being executed on it. The processing system 1202 has access to a computer-readable memory 1206 in addition to one or more data stores 1208. The one or more data stores 1208 may include input streams 1210 as well as coordination information 1212.

FIG. 10B depicts a system 1220 that includes a client server architecture. One or more user PCs 1222 access one or more servers 1224 running a multi-stream compositing engine 1226 on a processing system 1227 via one or more networks 1228. The one or more servers 1224 may access a computer readable memory 1230 as well as one or more data stores 1232. The one or more data stores 1232 may contain input streams 1234 as well as coordination information 1236.

FIG. 10C shows a block diagram of exemplary hardware for a standalone computer architecture 1250, such as the architecture depicted in FIG. 10A that may be used to contain and/or implement the program instructions of system embodiments of the present invention. A bus 1252 may serve as the information highway interconnecting the other illustrated components of the hardware. A processing system 1254 labeled CPU (central processing unit) (e.g., one or more computer processors at a given computer or at multiple computers), may perform calculations and logic operations required to execute a program. A non-transitory processor-readable storage medium, such as read only memory (ROM) 1256 and random access memory (RAM) 1258, may be in communication with the processing system 1254 and may contain one or more programming instructions for performing the method of generating a composite video. Optionally, program instructions may be stored on a non-transitory computer readable storage medium such as a magnetic disk, optical disk, recordable memory device, flash memory, or other physical storage medium.

A disk controller 1260 interfaces one or more optional disk drives to the system bus 1252. These disk drives may be external or internal floppy disk drives such as 1262, external or internal CD-ROM, CD-R, CD-RW or DVD drives such as 1264, or external or internal hard drives 1266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1260, the ROM 1256 and/or the RAM 1258. Preferably, the processor 1254 may access each component as required.

A display interface 1268 may permit information from the bus 1252 to be displayed on a display 1270 in audio, graphic, or alphanumeric format. Communication with external devices may optionally occur using various communication ports 1272.

In addition to the standard computer-type components, the hardware may also include data input devices, such as a keyboard 1273, or other input device 1274, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A computer-implemented method of generating a composite video based on a plurality of input video streams, comprising:
   receiving, at a compositing engine, a first video stream from a first device;
   receiving, at the compositing engine, a second video stream from a second device;
   receiving, at the compositing engine, coordination information from a coordinating device distinct from the compositing engine, wherein the coordination information is generated at the coordinating device based on the coordinating device receiving the first video stream and the second video stream, and further wherein the coordination information includes instructions for combining, at the compositing engine, the first video stream and the second video stream in a composite video;
   time aligning the first video stream and the second video stream; and
   using, at the compositing engine, the instructions of the coordination information and the time-aligned first video stream and second video stream to generate the composite video.

2. The method of claim 1, wherein the second video stream or the coordination information is generated after or during a playback of at least a portion of the received first video stream.

3. The method of claim 2, wherein a user views the playback and generates the second video stream or the coordination information.

4. The method of claim 1, further comprising:
   transmitting the first video stream to the second device.

5. The method of claim 1, wherein time aligning a particular video stream includes:
   determining a clock skew between a time measurement associated with the particular video stream and a master time measurement; and
   aligning the particular video stream with a master timeline based on the clock skew.

6. The method of claim 1, wherein time aligning the first video stream and the second video stream includes:
   determining a clock skew between a time measurement associated with the first video stream and a time measurement associated with the second video stream; and
   aligning the first video stream with the second video stream based on the clock skew.

7. The method of claim 1, wherein the first device or second device is a cellular phone, smartphone, videophone, digital camera, video camera, desktop computer, laptop computer, tablet computer, video game console, or server.

8. The method of claim 1, wherein the first video stream or the second video stream is video data, audio data represented as a video stream, a still image represented as a video stream, a screen capture represented as a video stream, an annotation event stream, a virtual ink event stream, a slide presentation, a virtual whiteboard event stream, or text represented as a video stream.

9. The method of claim 1, wherein the composite video is configured to display the first video stream and the second video stream in sub-regions of a composite video display, and wherein a size and a position of the sub-regions are determined based on the instructions in the coordination information.

10. The method of claim 1, wherein the instructions of the coordination information are configured to overlay the first video stream on the second video stream in the composite video, or to overlay the second video stream on the first video stream in the composite video.

11. The method of claim 1, wherein the first video stream or the second video stream is paused, stopped, rewound, fast-forwarded, opened, closed, slowed down, or sped up in the composite video based on the instructions in the coordination information.

12. The method of claim 1, wherein time aligning the first video stream and the second video stream is based on the instructions of the coordination information.

13. The method of claim 1, wherein the second video stream does not include portions of the first video stream.

14. The method of claim 1, wherein the coordination information is generated on the coordinating device using a software program.

15. The method of claim 14, wherein a user of the software program generates the coordination information by combining the first video stream and the second video stream on a virtual presentation canvas.

16. The method of claim 1, wherein the compositing engine is hosted by a remote server distinct from the first device and the second device.

17. The method of claim 1, wherein second device comprises the coordinating device.

18. The method of claim 1, wherein the coordinating device is used only for generating the coordination information and does not generate a video stream.

19. A computer-implemented method of generating a composite video based on a plurality of input video streams, comprising:
- receiving, at a compositing engine, a first video stream from a first device;
- receiving, at the compositing engine, a second video stream from a second device, wherein the second video stream is generated based on a display, at the second device, of the first video stream;
- receiving, at the compositing engine, a second video stream from a second device, wherein the second video stream is generated based on a display at the second device of the first video stream;
- receiving, at the compositing engine, a coordination information from a coordinating device distinct from the compositing engine, wherein the coordination information is generated at the coordinating device based on the coordinating device receiving the first video stream and the second video stream, and wherein the coordination information includes instructions for combining, at the compositing engine, the first video stream and the second video stream in a composite video; and
- combining, at the compositing engine, the first video stream and the second video stream in the composite video based on the coordination information.

20. The method of claim 19, wherein a user views the playback and generates the second video stream or the coordination information.

21. The method of claim 19, wherein the first video stream or the second video stream is video data, audio data represented as a video stream, a still image represented as a video stream, a screen capture represented as a video stream, an annotation event stream, a virtual ink event stream, a slide presentation, a virtual whiteboard event stream, or text represented as a video stream.

22. The method of claim 19, wherein the composite video is configured to display the first video stream and the second video stream in sub-regions of a composite video display, and wherein a size and a position of the sub-regions are determined based on the instructions in the coordination information.

23. The method of claim 19, wherein the instructions of the coordination information are configured to overlay the first video stream on the second video stream in the composite video, or to overlay the second video stream on the first video stream in the composite video.

24. The method of claim 19, wherein the first video stream or the second video stream is paused, stopped, rewound, fast-forwarded, opened, closed, slowed down, or sped up in the composite video based on the instructions in the coordination information.

25. The method of claim 19, wherein the instructions of the coordination information are configured to time align the first video stream and the second video stream in the composite video.

26. The method of claim 19, wherein the second video stream does not include portions of the first video stream.

27. The method of claim 19, wherein the coordination information is generated using a software program.

28. The method of claim 27, wherein the software program generates the coordination information by combining the first video stream and the second video stream on a virtual presentation canvas.

29. The method of claim 19, wherein the compositing engine is hosted by a remote server distinct from the first device and the second device.

30. The method of claim 19, wherein the second device comprises the coordinating device.

31. The method of claim 19, wherein the coordinating device is used only for generating the coordination information and does not generate a video stream.

* * * * *